United States Patent
Goswami et al.

(10) Patent No.: US 11,487,645 B2
(45) Date of Patent: Nov. 1, 2022

(54) PREDICTIVE TEST CASE COVERAGE

(71) Applicant: SAP SE, Walldorf (DE)

(72) Inventors: Amitabh Goswami, Bangalore (IN); Amrit Shankar Dutta Dutta, Bangalore (IN); Abhishek Hondad, Bangalore (IN); Alok Kumar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/121,665

(22) Filed: Dec. 14, 2020

(65) Prior Publication Data
US 2022/0188215 A1    Jun. 16, 2022

(51) Int. Cl.
G06F 9/44      (2018.01)
G06F 11/36     (2006.01)
G06F 16/2452   (2019.01)
G06F 8/75      (2018.01)

(52) U.S. Cl.
CPC .............. *G06F 11/368* (2013.01); *G06F 8/75* (2013.01); *G06F 11/3664* (2013.01); *G06F 11/3688* (2013.01); *G06F 16/24526* (2019.01)

(58) Field of Classification Search
None
See application file for complete search history.

(56) References Cited

U.S. PATENT DOCUMENTS

| | | | |
|---|---|---|---|
| 8,181,168 B1 | 5/2012 | Lee et al. | |
| 9,703,553 B2* | 7/2017 | Bates | G06F 8/73 |
| 2005/0204344 A1 | 9/2005 | Shinomi | |
| 2006/0168565 A1* | 7/2006 | Gamma | G06F 11/3688 717/122 |
| 2014/0331203 A1* | 11/2014 | Elshishiny | G06F 11/3676 717/124 |
| 2014/0380283 A1 | 12/2014 | Hu et al. | |
| 2017/0046245 A1* | 2/2017 | Liu | G06F 11/3688 |
| 2017/0351597 A1* | 12/2017 | Baset | G06F 8/75 |
| 2018/0095867 A1* | 4/2018 | Varadarajan | G06F 11/3688 |

(Continued)

OTHER PUBLICATIONS

Tiago Alves et al., "Static Estimation of Test Coverage", 2009 (Year: 2009).*

(Continued)

*Primary Examiner* — Wei Y Zhen
*Assistant Examiner* — Lanny N Ung
(74) *Attorney, Agent, or Firm* — Klarquist Sparkman, LLP

(57) ABSTRACT

A code base is parsed to identify methods having changes in a code base since a last code commit. Thereafter, a call graph is traversed to identify test cases implicated by the identified methods having changes in the code base. The call graph can be a directed call graph comprising a plurality of connected nodes in which a first subset of the connected nodes are method nodes representing each method in the code base in which unidirectional edges connecting method nodes correspond to invocations by a calling method to a callee method, and in which a second subset of the connected nodes are test case nodes representing each of a plurality of available test cases to test the code base. The test case nodes are each coupled to one or more method nodes by unidirectional edges that correspond to the test case coverage of the method.

20 Claims, 6 Drawing Sheets

(56) References Cited

U.S. PATENT DOCUMENTS

2019/0294536 A1* 9/2019 Avisror ................ G06F 8/433

OTHER PUBLICATIONS

Holton et al., "Construction of GCCFG for Inter-procedural Optimizations in Software Managed Manycore (SMM) Architectures," 2014.

Ma, "Droidstitcher: Stitching Dynamic Call Graphs for Debugging Android Applications," 2019.

* cited by examiner

PREDICTIVE TEST CASE COVERAGE

TECHNICAL FIELD

The subject matter described herein is directed to the identification of software application test cases, as part of a software development process, that efficiently address changes to a code base after it has been modified thereby reducing the time required for pull requests.

BACKGROUND

Software development is often an iterative process during which code is generated on a local computing device or file share system, the generated code is committed to a code repository, and the code based in the code repository is then tested to identify errors. In some cases, the testing is performed using test cases which are applied to the code base in the code repository. These test cases can, in some cases, require significant computing resources and, additionally take, a large amount of time to execute. Execution of unnecessary test cases further delays deployment of the code base and diminishes developer productivity.

SUMMARY

In a first aspect, a code base is parsed to identify methods having changes in a code base since a last code commit. Thereafter, a call graph is traversed that represents control flow relationships amongst the methods in the code base to identify test cases implicated by the identified methods having changes in the code base. Data can then be provided (e.g., displayed in a graphical user interface, stored in physical persistence, loaded into memory, transmitted to a remote computing device, etc.) that characterizes the identified test cases. The call graph can be a directed call graph comprising a plurality of connected nodes in which a first subset of the connected nodes are method nodes representing each method in the code base in which unidirectional edges connecting method nodes correspond to invocations by a calling method to a callee method, and in which a second subset of the connected nodes are test case nodes representing each of a plurality of available test cases to test the code base. The test case nodes are each coupled to one or more method nodes by unidirectional edges that correspond to coverage of the method by the test case corresponding to the connected test case node. The call graph is traversed from each method node corresponding to the identified methods changed in the code base to identify test cases covering such methods.

One or more of the identified test cases can be executed and data characterizing the results of such execution can be provided.

The call graph can be stored in a graph database which can be polled to obtain the call graph prior to the traversing.

A code repository storing the code base can be accessed prior to the parsing.

The parsing can include generating a first abstract syntax tree representation of the code base at the time of the last code commit, generating a second abstract syntax tree representation of the code base including the changes since the last code commit, and comparing the first abstract syntax tree representation of the code to the second abstract syntax tree representation of the code.

The parsing can include comparing source code of the code base at the time of the commit to the source code of the code base after the changes.

The parsing can include analyzing a subsequent commit sent to the code repository characterizing changes to the code base since the last commit. Such a subsequent commit can include or identify which methods were changed since the last commit.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter is advantageous in that it reduces an amount of test cases to be executed in response to changes to a code base.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to enhanced techniques for testing a code base by identifying a minimal amount of test cases that need to be executed in response to an update or other change to the code base (especially as applicable to versioning updates to a continually evolving code base). Such techniques leverage a directed graph that defines the interrelationships between methods, and additionally, specifies coverage of each test case. In some cases, a stitching algorithm can be used to selectively add edges to the directed call graph. Example stitching algorithms are further described in U.S. patent Ser. No. 17/121,496 filed concurrently herewith, the contents of which are hereby fully incorporated by reference.

A test case, in this regard, is a set of actions to be executed to verify a particular feature or functionality of a software application. In particular, a test case can encapsulate a specification of the inputs, execution conditions, testing procedure, and expected results that define a single test to be executed to achieve a particular software testing objective in relation to a code base being developed. A test case typically comprises an identification, a summary/description (which can be searched), steps forming part of the test, and other related metadata/contextual data associated with the test case. Each test case can, in some variations, comprise one or more test scripts comprising code required to execute the actions specified by the test case.

Figure 1:
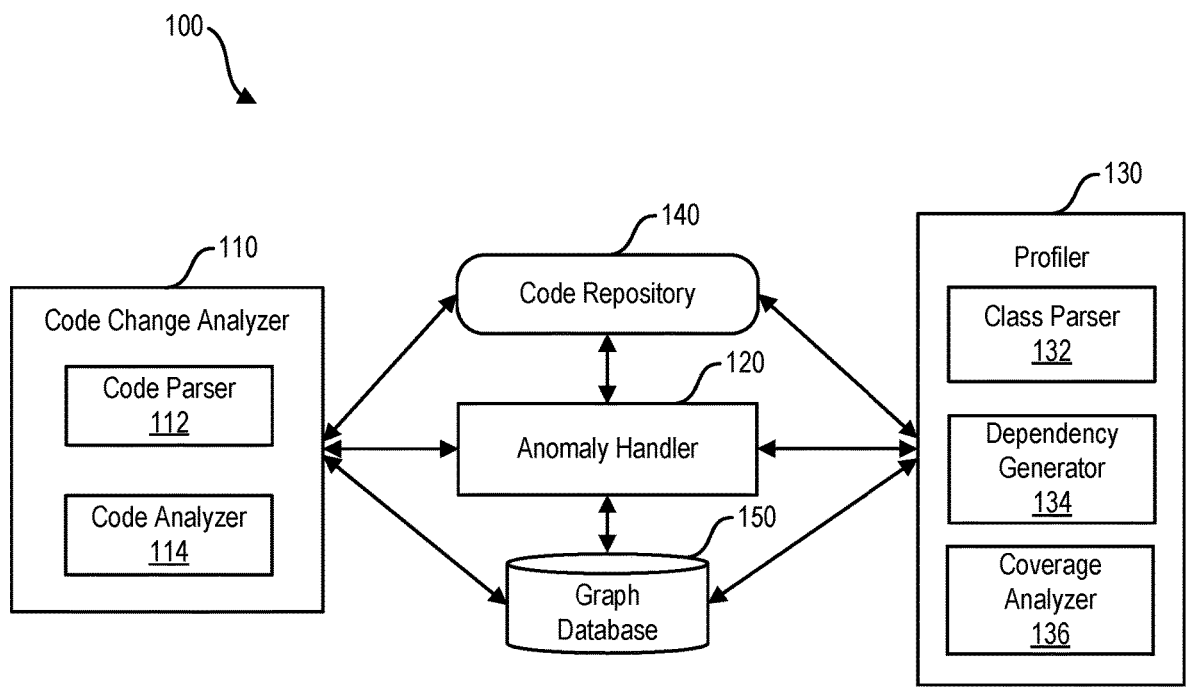
FIG. 1 is a diagram illustrating an architecture for identifying test cases implicated by changes in a code base since a last commit.

FIG. 1 is a diagram 100 illustrating a sample architecture for implementing aspects of the current subject matter. The architecture can include components such as a code change analyzer 110, an anomaly handler 120, a profiler 130. These components 110, 120, 130 can be software modules/code executed by one or more computing devices (either local or distributed).

The components 110, 120, 130 can also be in communication with a code repository 140 which can take various forms including, a dedicated database or a software-as-a-service cloud-based code development management platform (e.g., GITHUB). The profiler 130 can generate and save relevant data from source code, byte code and test coverage reports in the filesystem. The code change analyzer 110 provides the test case recommendation depending on the code base changes and data collected by the profiler 130. Further, the architecture can include a graph database 150 which can store the directed call graphs as provided herein.

The anomaly handler 120 can be used to handle less frequent situations such as a code change implicating more than 30% of the test cases or a code change having a number of files above a pre-defined threshold (e.g., five or more files). In such cases, a user can manually specify which test cases to execute or other exceptional handling can be performed with regard to the corresponding code changes. In other words, the anomaly handler 120 can handle deviations or take actions depending on a certain rule being triggered to fine tune the overall system. The anomaly handler 120 can execute a stitching algorithm as described below. The anomaly handler 120 can additionally run a complete test suite (i) in cases in which the number of implicated test cases is above a pre-defined threshold (e.g., 20%, etc.); (ii) against code changes of specific classes or call graphs; (iii) to a change-set crossing a predefined threshold in terms of number of methods or lines changed; or (iv) to non JAVA-based changes such as 'xml'/build files. The anomaly handler 120 can also log certain actions/results and generate alerts/messages indicating, for example, that no test cases were found in response to a particular change set (i.e., a change to the code base). The anomaly handler 120 can also identify impacted tests based on class rather than based on method when only the import statement is added/modified and/or when a class is moved. Further, the anomaly handler 120 can provide that a predefined set of critical tests are executed when there are white space changes and the like.

The profiler 130 can maintain or access information about the code base in the code repository 140 including changes (sometimes referred to as deltas) which occur in between versions or other user-defined commits. The profiler 130 can also generate a call graph (as described in further detail below) which can be a bi-directional nth level call graph. Using the call graph, the profiler 130 can also generate the coverage per test case. Coverage, in this regard, refers to which methods forming part of the code base are affected by a particular test case.

The code change analyzer 110 can parse a commit provided by a revision control tool using a code parser 112 in connection with a code analyzer 114 to identify deltas of the code base in the code repository 140. The code change analyzer 110 provides the file(s) that are modified along with the method(s). This set of files and its method are passed to the code analyzer 114 module for further analysis. The code analyzer 114 can return the changes in terms of classes, methods or lines. In some variations, the delta changes can be characterized in terms of changes to methods. In other variations, different granularities of changes can be characterized such as on a line-by-line basis. In such cases, the nodes of a directed graph would represent lines of code.

The code forming the code base can take various forms and the code change analyzer 110 can use varying parsers as may be required by the particular code type. In some variations, an abstract syntax tree representation ("AST") of the code base at the time of the commit and an AST of the code base after the changes can be compared to identify changes to methods, lines, and the like. For example, when the code base in the code repository 140 comprises JAVA source code, a JAVA parser can be used to identify or otherwise characterize changes to the code base.

A source code parser parses the source code to create some form of internal representation. The source code parser takes source code as input data and builds a data structure in the form of a parse tree, AST(Abstract Syntax Tree) or other hierarchical structure, giving a structural representation of the input source code. AST provides detailed information about all attributes/elements of JAVA source code. This representation can provide the package name of source code, import statements, type of source code (class/interface), internal attributes of class/interface (e.g., methods, constructors or field declaration), as well as start line and end line for each attribute. All of this information can be used to precisely identify source code modification for any change set. In some variations, JGIT library can alternatively or additionally be used to analyze source code as well as code repository commits (e.g., GIT Commits when the code repository 140 is GITHUB or a compatible repository) as opposed to the AST representation of the changes to the code.

The code change analyzer 110 can be used to provide byte code analysis metrics by analyzing compiled artifacts (e.g., JAR files, etc.) in order to generate a call graph so that, for given delta changes, the minimal number of required test cases can be determined (and then later executed). The code change analyzer 110 which can be a static code analyzer, can identify changed methods in the code based which can be transformed as nodes in a disconnected graph. After the code analyzer 110 establishes relations between methods in the code base, the whole codebase can be represented as a graph with many disconnected components. The nodes in the graph can each represent a method in the target codebase whereas each method is defined through node properties. Fully qualified class name, method name, and a parameters list are properties which can uniquely identify each method. Before the code analyzer 110 runs, the whole codebase is merely a disconnected graph of unique methods. The code analyzer 110 can also output caller and callee relationships among the methods. These relations among the methods can be represented as directed edges between the method nodes.

The relations which are not explicitly discovered by the code analyzer 110 can then be transformed into edges by providing specific algorithms depending on the yet to be discovered design patterns. Such specific algorithms are referred to herein as stitching algorithms and are described in further detail below.

Call graphs, in this context, are directed graphs representing control flow relationships amongst the methods of an application (associated with the code base). The nodes of the graph are the methods, while an edge from node 'node1' to node 'node2' indicates that method 'node1' invokes method 'node2'. The call graph can be generated by converting the source code forming part of the code base into an AST representation.

Figure 2:
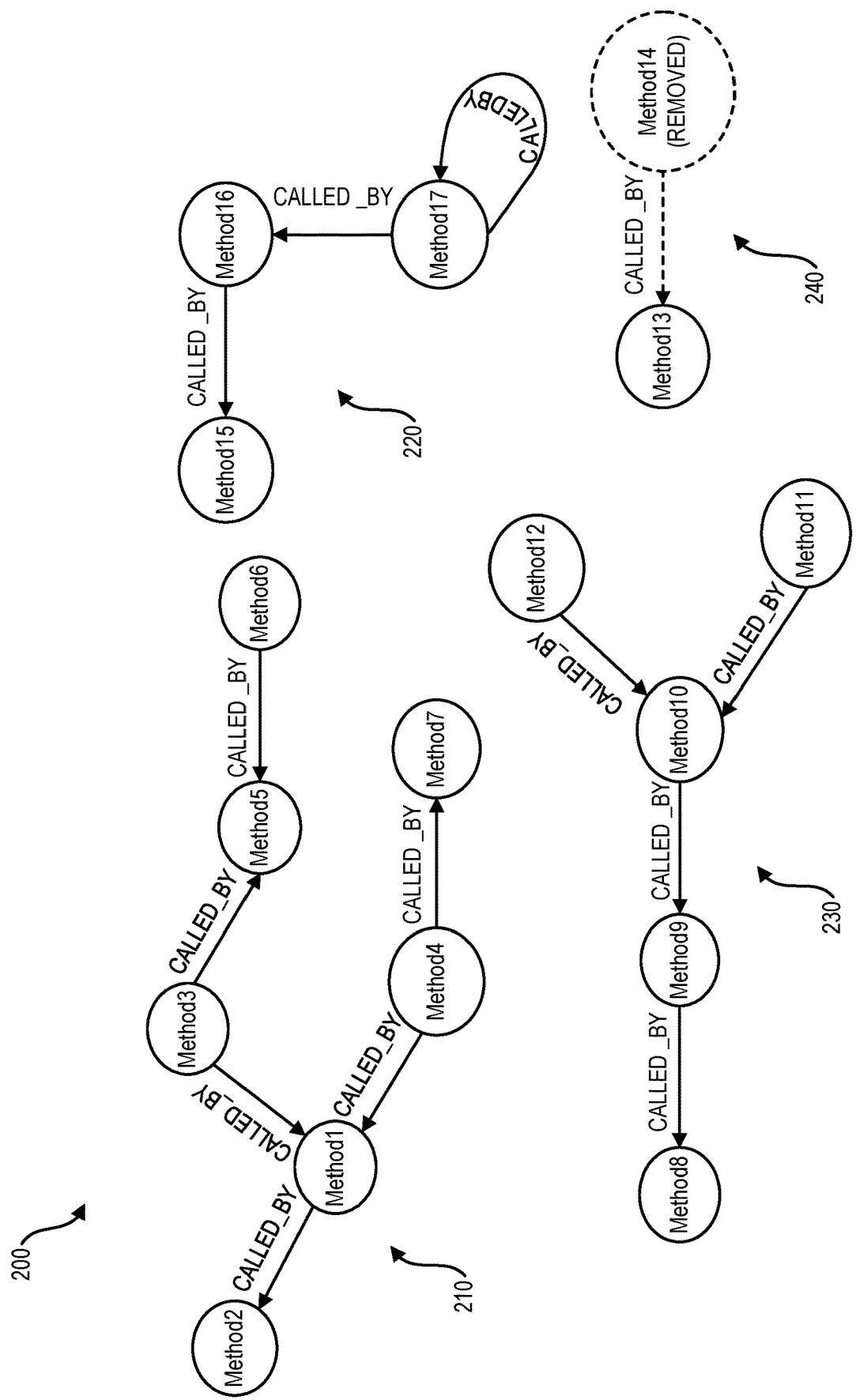
FIG. 2 is a diagram illustrating an example methods call graph.

FIG. 2 is a diagram 200 illustrating a sample call graph in which a plurality of nodes corresponds to different methods of the code base (Method1 . . . Method17). The edges connecting the nodes are defined by the caller and callee relationships (method calling another method) amongst such nodes as specified in the byte code. By tracing the complete call sequence of the methods in the code base, these methods exhibit the structure of a graph, even the self-loop is completely legal.

As mentioned above, one variation is to analyze the commit (e.g., git commit) since a last (i.e., most recent commit) to identify a set of methods that changes. A call graph can then be accessed to determine all related methods that should be probed as potentially being covered by a test case. The full result set of recommended test cases can be provided in various manners including loading into memory, storing in physical persistence, displaying a graphical user interface, transmitted to a remote computing system, and the like.

In some cases, the call graph can be stored in the graph database 150. A graph database 150, in this regard, refers to a database that uses graph structures for semantic queries for nodes, edges, and properties to represent and store data. The graph database 150 can provide more rapid response time and can take various forms.

Figure 3:
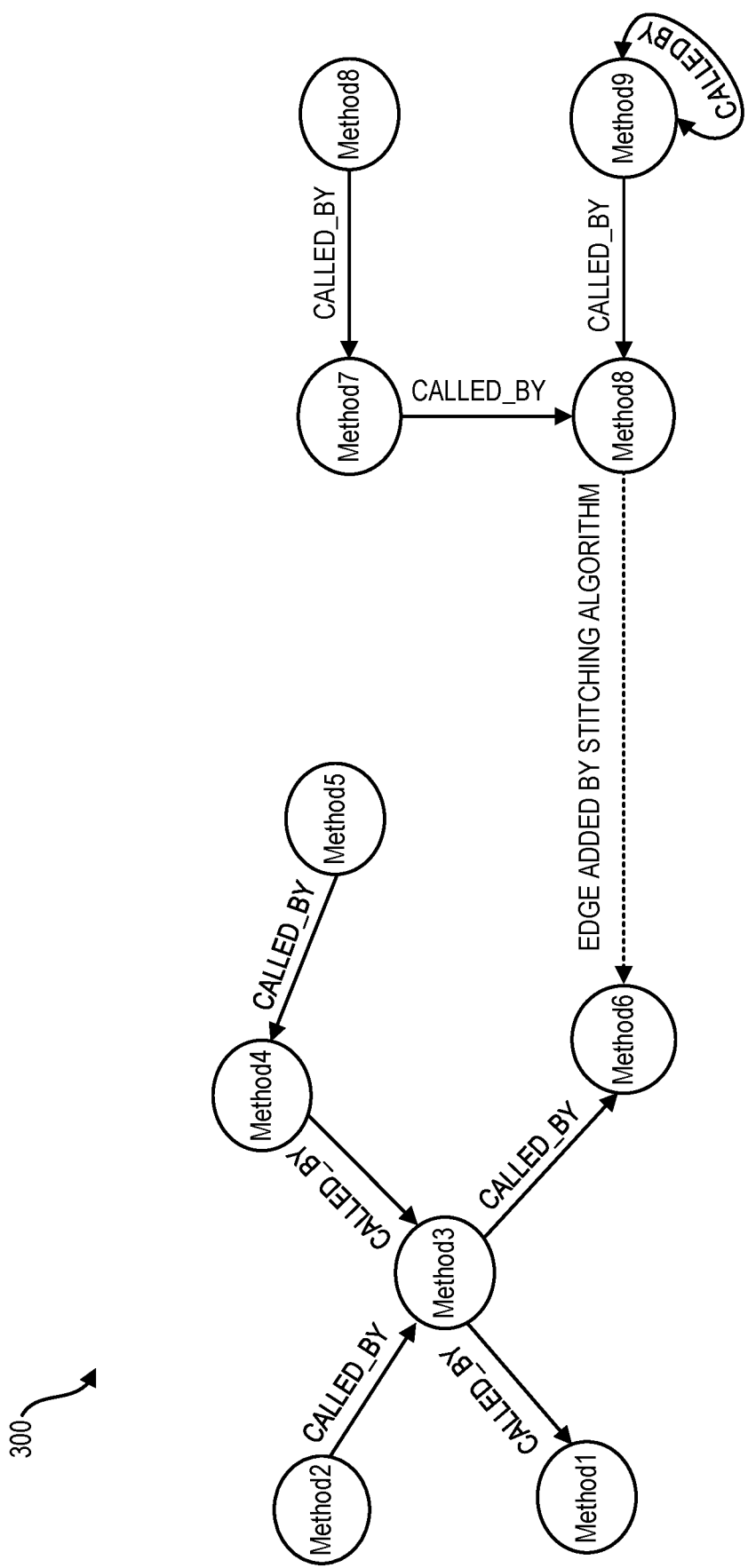
FIG. 3 is a diagram illustrating a methods call graph to which a stitching algorithm generates an edge between two disconnected nodes.

In some cases, as illustrated in diagram 300 of FIG. 3, the call graph may initially have disconnected nodes. Such idiosyncrasies can appear in the code base due to implementation of non-standard design patterns, JAVA reflections, runtime weaving etc. These disconnects can be problematic in that interrelations amongst the method nodes may not be adequately captured (and thus not all implicated test cases may be identified). A stitching algorithm can be utilized to add edges to disconnected method nodes in the call graph of FIG. 3 such as between Method8 and Method6 (indicating that Method8 is called by Method6 and as such, changes to Method8 should include test cases covering Method6).

The stitching algorithm can be used to connect disconnected method nodes. Pseudocode for the stitching algorithm can be as follows.

Algorithm:
   Initialize :
      Set D := { All standard and non-standard design patterns which are not discoverable by static code analyzer}
        Repeat for each Design Pattern $D_1$ belonging to Set D
          1) Set CALLED := Find out the set of methods nodes which should be called in runtime depending on $D_1$.
          2) Set CALLEE := Find out the set of methods nodes which should be calling above methods in runtime depending on $D_1$.
          3) IF both the set CALLED and CALLEE is non-empty go to step 4, otherwise CONTINUE.
          4) Add directed edges to the set of nodes identified by CALLEE from the set of nodes identified by CALLED.

For example, with a particular exemplary application XYZ, ABC is a popular design pattern. ABC is invoked by instantiating an ABC object and passing it to an ABC handler. ABC handler can try to find the implementation by appending 'Impl' at the end of the ABC object name and discover it in specific packages. The code analyzer 110, in this situation, cannot create a complete call graph out of it. Thus, the stitching algorithm can find an immediate caller of ABC constructor and can stitch it to the method node corresponding to the ABC implementer in the call graph. Now, the ABC implementation becomes the participant in the end to end call graph.

Figure 4:
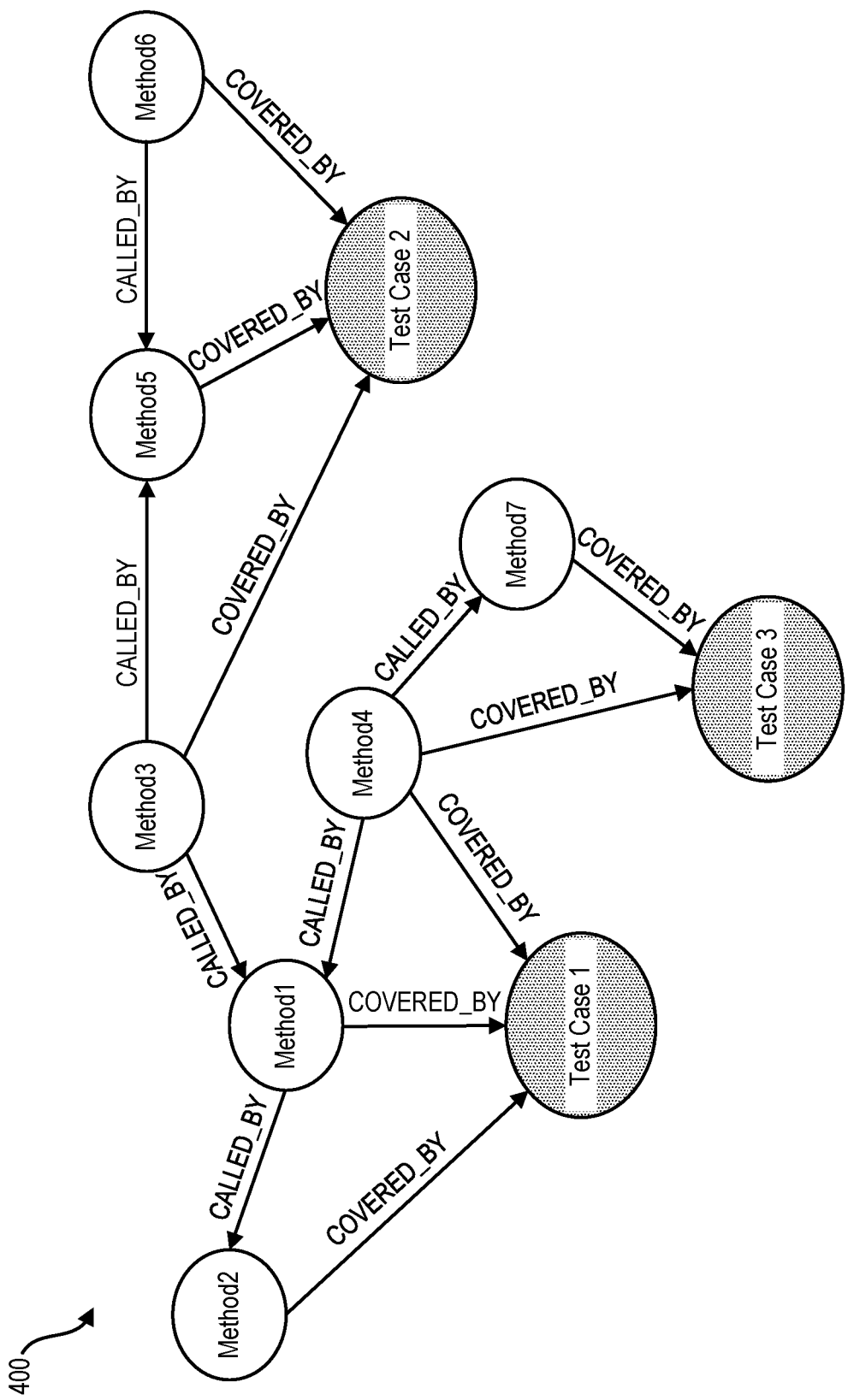
FIG. 4 is a diagram illustrating an expanded method call graph with method nodes and test case nodes.

With reference to diagram 400 of FIG. 4, each method can be represented as a method node in the call graph, connected with other nodes by edges named as 'called by'. These edges are unidirectional as a call only occurs in a single direction. The call graph (containing only method nodes) can be supplemented to represent test cases by way of different type of nodes, namely test case nodes, that have a strong relationship with the method nodes mentioned earlier. As illustrated, these test case nodes can be connected to the method nodes by edges named as 'covered by'. 'Covered by' in this regard, refers to the test case associated with such node involving the method connected via the edge.

The coverage analyzer 136 forming part of the profiler 130 can be used to characterize the relationship between test cases and methods. The coverage analyzer 136 can individually run all of the test cases specified for the code base in question and find which methods are covered by such tests. As an example, one or more of the test cases can be executed using tools along with the code coverage report for every test-case individually. The generated report can be parsed to get the methods corresponding to the test-case and this relationship can then be inserted into the graph database 150.

Figure 5:
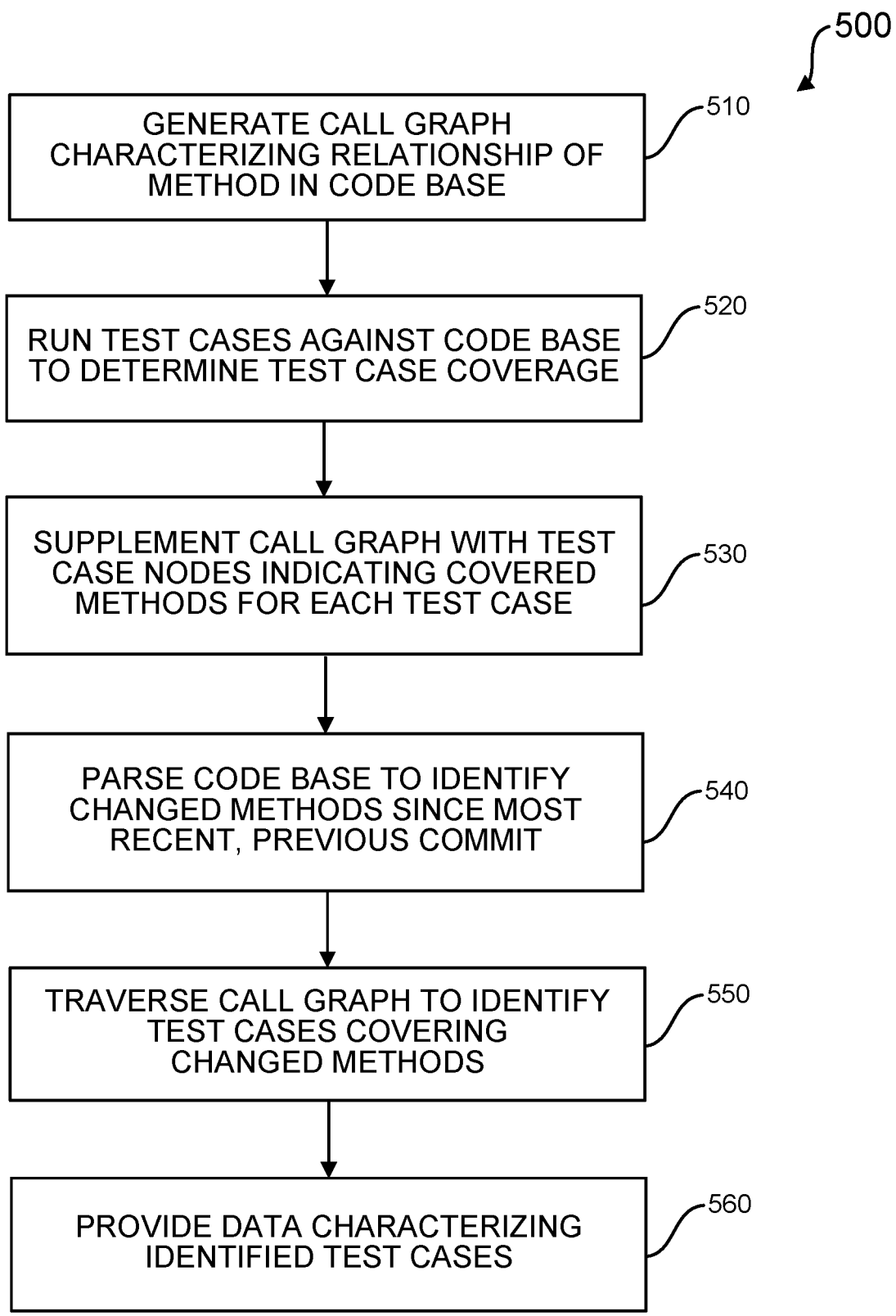
FIG. 5 is a process flow diagram illustrating identification of test cases implicated by changes to code in a code base since a most recent commit.

FIG. 5 is a diagram 500 in which, at 510, a code analyzer generates a call graph in which there are method nodes representing each method in a code base in which unidirectional edges connecting method nodes correspond to invocations by a calling method to a callee method. Thereafter, at 520, a plurality of test cases are run against the code base to identify, for each test case, one or more corresponding methods in the code base that are covered by such test case. Next, at 530, the call graph is supplemented with test case nodes representing each of a plurality of available test cases to test the code base. The test case nodes are each coupled to one or more method nodes by unidirectional edges that correspond to coverage of the method by the test case corresponding to the connected test case node. Later, at 540, a code base is parsed to identify methods having changes in a code base since a last code commit. The call graph is then traversed, at 550, that represents control flow relationships amongst the methods in the code base to identify test cases implicated by the identified methods having changes in the code base. Next, at 560, data can be provided that characterizes the identified test cases.

Figure 6:
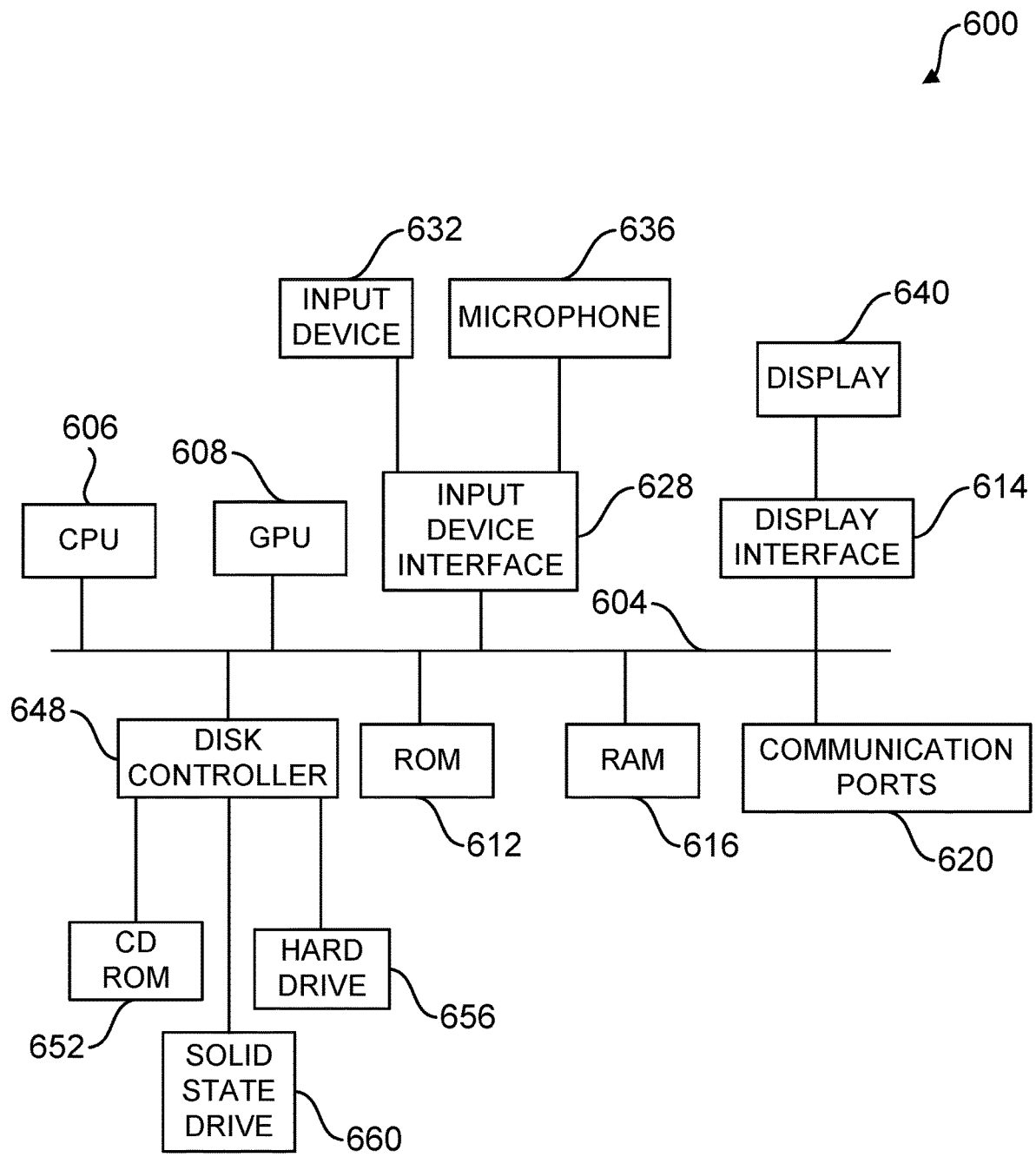
FIG. 6 is a diagram illustrating a computing device for implementing aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   parsing a code base to identify methods having changes in a code base since a last code commit;
   traversing a single call graph of connected nodes representing control flow relationships amongst each of the methods in the code base to identify a minimum number of test cases, wherein the minimum number of test cases are only those test cases that are implicated by the identified methods having changes in the code base;

causing data characterizing the identified minimum number of test cases to be displayed in a graphical user interface; and executing the identified minimum number of test cases; wherein:

the single call graph is a directed call graph comprising a plurality of connected nodes;

a first subset of the connected nodes are method nodes representing each method in the code base in which unidirectional edges connecting method nodes correspond to invocations by a calling method to a callee method;

a second subset of the connected nodes are test case nodes representing each of a plurality of available test cases to test the code base, the test case nodes are each coupled to one or more method nodes, of the first subset, by unidirectional edges that correspond to coverage of the method by the test case corresponding to the connected test case node;

the single call graph is traversed from each method node corresponding to the identified methods changed in the code base to identify test cases covering such methods.

2. The method of claim 1, further comprising:

providing data characterizing the identified minimum number of test cases, wherein the providing data characterizing the identified minimum number of test cases comprises: loading the data characterizing the identified minimum number of test cases into memory, storing data characterizing the identified minimum number of test cases in physical persistence, or transmitting the data characterizing the identified minimum number of test cases to a remote computing device.

3. The method of claim 1, wherein the single call graph is stored in a graph database, and the method further comprises:

polling the graph database to obtain the single call graph prior to the traversing.

4. The method of claim 1 further comprising:

accessing a code repository storing the code base prior to the parsing.

5. The method of claim 1, wherein the parsing comprises:

generating a first abstract syntax tree representation of the code base at the time of the last code commit;

generating a second abstract syntax tree representation of the code base including the changes since the last code commit; and comparing the first abstract syntax tree representation of the code to the second abstract syntax tree representation of the code.

6. The method of claim 1, wherein the parsing comprising:

comparing source code of the code base at the time of the commit to the source code of the code base after the changes.

7. The method of claim 1, wherein the parsing comprises:

analyzing a subsequent commit sent to the code repository characterizing changes to the code base since the last commit.

8. The method of claim 7, wherein the subsequent commit comprises which methods were changed since the last commit.

9. The method of claim 1, wherein the identified minimum number of test cases are displayed in the graphical user interface as recommended test cases to be executed.

10. The method of claim 1, wherein identifying the minimum number of test cases comprises identifying that a first test case, of the plurality of available test cases, and a second test case, of the plurality of available test cases, are implicated by the identified methods having changes in the code base, and wherein executing the identified minimum number of test cases comprises executing the identified first test case and the identified second test case.

11. A system comprising:

at least one data processor; and memory storing instructions which, when executed by the at least one data processor, result in operations comprising:

parsing a code base to identify methods having changes in a code base since a last code commit;

traversing a single call graph of connected nodes representing control flow relationships amongst each of the methods in the code base to identify a minimum number of test cases, wherein the minimum number of test cases are only those test cases that are implicated by the identified methods having changes in the code base;

causing data characterizing the identified minimum number of test cases to be displayed in a graphical user interface; and executing the identified minimum number of test cases; wherein:

the single call graph is a directed call graph comprising a plurality of connected nodes;

a first subset of the connected nodes are method nodes representing each method in the code base in which unidirectional edges connecting method nodes correspond to invocations by a calling method to a callee method;

a second subset of the connected nodes are test case nodes representing each of a plurality of available test cases to test the code base, the test case nodes are each coupled to one or more method nodes, of the first subset, by unidirectional edges that correspond to coverage of the method by the test case corresponding to the connected test case node;

the single call graph is traversed from each method node corresponding to the identified methods changed in the code base to identify test cases covering such methods.

12. The system of claim 11, the operations further comprising:

providing data characterizing the identified minimum number of test cases, wherein the providing data characterizing the identified minimum number of test cases comprises: loading the data characterizing the identified minimum number of test cases into memory, storing data characterizing the identified minimum number of test cases in physical persistence, or transmitting the data characterizing the identified minimum number of test cases to a remote computing device.

13. The system of claim 11, wherein the single call graph is stored in a graph database, and the operations further comprise:

polling the graph database to obtain the single call graph prior to the traversing.

14. The system of claim 11, wherein the parsing comprises:
  generating a first abstract syntax tree representation of the code base at the time of the last code commit;
  generating a second abstract syntax tree representation of the code base including the changes since the last code commit; and
  comparing the first abstract syntax tree representation of the code to the second abstract syntax tree representation of the code.

15. The system of claim 11, wherein the parsing comprising:
  comparing source code of the code base at the time of the commit to the source code of the code base after the changes.

16. The system of claim 11, wherein the parsing comprises:
  analyzing a subsequent commit sent to the code repository characterizing changes to the code base since the last commit.

17. The system of claim 16, wherein the subsequent commit comprises which methods were changed since the last commit.

18. The system of claim 11, wherein the identified minimum number of test cases are displayed in the graphical user interface as recommended test cases to be executed.

19. A non-transitory computer program product storing instructions which, when executed by the at least one computing device, result in operations comprising:
  parsing a code base to identify methods having changes in a code base since a last code commit;
  traversing a single call graph of connected nodes representing control flow relationships amongst each of the methods in the code base to identify a minimum number of test cases, wherein the minimum number of test cases are only those test cases that are implicated by the identified methods having changes in the code base; and
  causing data characterizing the identified minimum number of test cases to be displayed in a graphical user interface; and
  executing the identified minimum number of test cases;
  wherein:
    the single call graph is a directed call graph comprising a plurality of connected nodes;
    a first subset of the connected nodes are method nodes representing each method in the code base in which unidirectional edges connecting method nodes correspond to invocations by a calling method to a callee method;
    a second subset of the connected nodes are test case nodes representing each of a plurality of available test cases to test the code base, the test case nodes are each coupled to one or more method nodes, of the first subset, by unidirectional edges that correspond to coverage of the method by the test case corresponding to the connected test case node;
    the single call graph is traversed from each method node corresponding to the identified methods changed in the code base to identify test cases covering such methods.

20. The non-transitory computer program product of claim 19, wherein the parsing comprises:
  generating a first abstract syntax tree representation of the code base at the time of the last code commit;
  generating a second abstract syntax tree representation of the code base including the changes since the last code commit; and
  comparing the first abstract syntax tree representation of the code to the second abstract syntax tree representation of the code.

* * * * *